(No Model.)
A. KAYSER.
PROCESS OF MAKING ALKALINE SILICATES AND CARBONATES.
No. 376,409. Patented Jan. 10, 1888.
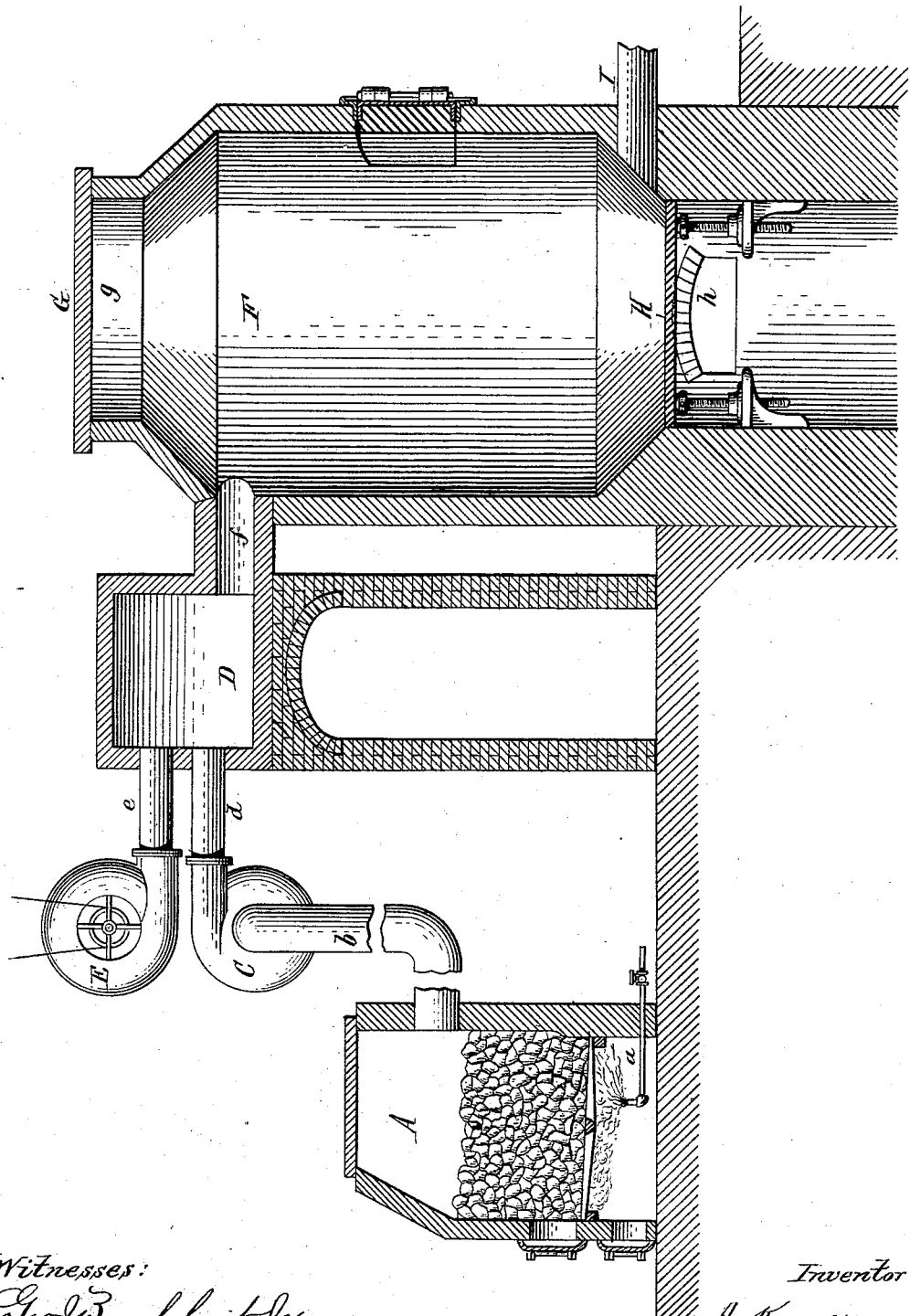
Witnesses:
Geo. J. Buchheit Jr.
Chas. J. Buchheit
Inventor:
A. Kayser.
By Wilhelm & Bonner.
Attorneys.

UNITED STATES PATENT OFFICE.

ADOLF KAYSER, OF BUFFALO, NEW YORK, ASSIGNOR OF TWO-THIRDS TO HORACE WILLIAMS AND ALBERT B. YOUNG, BOTH OF SAME PLACE.

PROCESS OF MAKING ALKALINE SILICATES AND CARBONATES.

SPECIFICATION forming part of Letters Patent No. 376,409, dated January 10, 1888.

Application filed August 3, 1887. Serial No. 246,005. (No specimens.)

*To all whom it may concern:*

Be it known that I, ADOLF KAYSER, a citizen of the United States, residing at Buffalo, in the county of Erie and State of New York, have invented new and useful Improvements in the Manufacture of Caustic Alkali, Carbonates of the Alkaline Metals, and Muriatic Acid, of which the following is a specification.

This invention relates to a pneumatic process for the manufacture of caustic alkali, carbonates of the alkaline metals, and muriatic acid.

The principal objects of this invention are to shorten and cheapen the process of manufacture, to obviate the loss of sulphur which occurs in the Le Blanc process, and the loss of chlorine which occurs in the ammonia process, and to render the apparatus simple and inexpensive, and to reduce the skilled labor to a minimum.

It is well known that the reaction of sodium chloride upon clay in the presence of steam at a high temperature produces muriatic-acid gas and a combination of sodium oxide with alumina and silica. It has heretofore been attempted in various ways to render this reaction available for the production of salts containing sodium oxide, but heretofore these attempts have not produced useful results, principally because the chloride was converted only in part, and because, even if a soluble alkaline salt could be produced, it was impossible to separate the aluminous and silicious matter from the caustic lye. It has been proposed, for instance, to evaporate the chloride upon a hearth by generator-gases passing over the charge of chloride and to conduct this vapor, together with steam, through a tower charged with silica, clay, or other similar material. By this method the outer portions of the lumps of clay become glazed, whereby the further reaction of the chloride and steam upon the clay is rendered impossible.

In practicing my invention I mix clay, common salt, and sufficient water to render the mixture plastic, and mold the same, by a suitable brick-machine, into cakes or bricks of convenient size, a size of three by two by one and one-half inches being suitable. These cakes are dried and then placed in a converter of suitable capacity, which converter is heated by a current of hot gases passing through the same. A column of these cakes eight feet high or more is easily heated in this manner to a bright-red heat and maintained at this temperature until the conversion is completed. The reaction of the sodium chloride upon the hydrous clay is very energetic. Muriatic-acid gas is generated long before visible red heat is reached, and the generation of this gas increases rapidly as the temperature rises. Steam is admitted to the converter with the hot gases, as its presence is indispensable after the chemically-combined water has been driven off from the clay. After about six hours the temperature has reached a bright-red heat throughout the converter, and this temperature is maintained until the conversion is completed, which usually occurs in from eighteen to twenty-four hours after the proper temperature has been reached. The muriatic acid which is generated is condensed and collected in any usual or well-known manner. The converted material so produced I call "acid silico-sodium aluminate." The clay and salt are mixed in such proportions that this converted material contains on an average thirty-three per cent. of sodium oxide. This converted material is insoluble, or only partially soluble, in water, according to the temperature at which it was prepared and the composition or character of the clay employed. It is infusible, even at the beginning of white heat, but the cakes contract and lose their porosity at such temperature, while their composition remains unchanged. For this reason a wide range of temperature during conversion is admissible, provided that a lively red heat is reached and maintained for a sufficient time. This acid salt reacts slightly alkaline and is practically insoluble in water, but is attacked easily by mineral acids. Even a digestion with bicarbonate of soda will render some of the sodium oxide soluble; but in order to extract the sodium oxide fully I employ the following treatment: I crush the material and smelt it together with a suitable quantity of alkali, whereby a basic silico-sodium aluminate is produced which is very deliquescent and which yields all of its sodium combinations by lixiviation under development of considerable heat. I prefer for this purpose to add to the acid silico-sodium aluminate such a quantity of soda as will raise the total contents in sodium combinations to about fifty per cent. The smelted basic salt is drawn into forms, cooled, crushed to about nut size, and leached in water. The solution or caustic lye so produced contains practically all of the sodium combinations contained in the basic compound, which combinations consist of from eighty to ninety per cent. of caustic soda, the rest being sodium carbonate and silico-aluminate of sodium. This caustic lye may be directly employed for industrial purposes, for instance, in the manufacture of soap. The undissolved residue, which I call "regenerated clay," consists of clay which has almost the same composition as the clay originally employed. This basic silico-sodium aluminate should contain about fifty per cent. of sodium oxide, in order to permit of a speedy and complete lixiviation. When the percentage of sodium oxide is much less than fifty per cent., the solid undissolved matter is hard, little porous, and penetrated with difficulty by water. When the percentage of sodium oxide is much in excess of fifty per cent., the solid matter assumes the form of slush or soft mud, which renders the lixiviation and complete separation of the caustic liquid from the solid matter impossible. When the percentage of sodium oxide is about fifty per cent., the material upon being placed in water breaks up into small chips, splinters, or fragments by numerous cracks extending through the lumps, which chips or fragments facilitate the thorough permeation of the mass by the water and are still sufficiently solid and bulky to permit of their easy separation from the lye or liquid. When the basic silico-aluminate is subjected to the process of lixiviation, but a small quantity of flocculent matter is produced, which consolidates by molecular attraction into gelatinous masses. The latter adhere to the splinters or chips of solid matter here and there without interfering with the operation of lixiviation. The regenerated clay so recovered is specifically lighter than the original clay and whiter in color, as it has lost its iron; but this regenerated clay which has the hardness of soft slate answers all the purposes of the original clay, and is used over repeatedly, only such quantities of fresh clay being added from time to time as may be necessary to compensate for loss by manipulation. If the clay employed in this process contain lime and magnesia salts in appreciable quantities, such salts will accumulate by repeatedly using the clay until the excess of these salts finally present in the regenerated clay necessitates the renewal of the clay.

The caustic soda and sodium carbonate are obtained from the solution in any suitable manner, which depends upon the character of the desired ultimate product. Clay, being a hydrous aluminum silicate, acts upon the sodium chloride very energetically and at a comparatively low temperature.

It is desirable that the proportion of silica to alumina in the clay employed should be about as two to one, because, although other proportions do not materially affect the conversion in producing an acid salt, the proportion stated facilitates the subsequent treatment of the converted acid salt and the elimination of the silica and alumina from the sodium combinations. When the clay contains more than the above proportion of alumina, the acid salt resulting from the conversion requires more alkali and a higher temperature to render it soluble and the regenerated clay is slushy and cannot be separated from the caustic lye. When the clay contains silica in excess of the above proportions, the silica is not sufficiently protected by alumina during the process of leaching, and the lye is richer in the constituent elements of the clay, and the latter will also be more slushy or pulverulent.

Clay of the composition above pointed out is seldom found, and in order to meet the requirements of this process I prepare a clay of the desired composition by adding sand to the clay or removing sand from the clay, by washing or otherwise, as may be necessary. This elimination of both silica and alumina during the leaching of the basic salt is an important feature in the manufacture of soda from the silico-sodium aluminate. The silica combines with the alumina in *status nascens*, while at the same time water enters the combination, forming hydrated aluminum silicate and sodium hydrate.

At the beginning of the manufacture the necessary quantity of soda must be supplid to render the first converted acid salt soluble. Afterward a proper quantity of the tank liquor or solution is added to the acid salt instead of soda, and the mixture is evaporated to dryness and smelted upon a suitable hearth preparatory to leaching.

The accompanying drawing represents a sectional elevation of the apparatus which is preferably employed in practicing my invention.

A represents the gas-generator, which may be of any suitable construction, and which is charged with coal, coke, or other suitable fuel.

A represents the pipe by which steam is supplied to the generator.

$b$ represents the pipe by which the gas escapes from the generator.

C represents a fan-blower or other apparatus connected with the gas-pipe $b$.

$d$ represents the discharge-pipe of the fan C, and D represents the combustion-chamber, into which the gas is delivered by the pipe $d$.

$e$ represents a pipe by which a blast of air is delivered from a fan-blower, E, or other suitable apparatus, into the combustion-chamber D, for burning the gas in the same.

F represents the converter, connected near its top with the combustion-chamber D by a pipe, $f$, through which the hot gases pass from the combustion-chamber to the converter. The latter is provided in its top with a feed-opening, $g$, having a removable cover, G, and in its bottom with a discharge-opening, $h$, provided with a removable bottom, H.

I represents a pipe, which connects with the lower portion of the converter, and through which the waste gases escape from the same and pass to the condenser in which the muriatic-acid gas is condensed. When two or more converters are used in a battery, the gas-exit pipe I of one converter is connected with the gas-inlet of the next following converter.

While I recommend the employment of this apparatus, I do not wish to confine myself to the same, as it may be modified without departing from my invention.

The gases which enter the converter should contain a sufficient quantity of steam to furnish hydrogen for combination with the chlorine and an excess of oxygen to prevent the formation of carbon monoxide and the reducing action resulting therefrom. These gases permeate the entire charge in the converter and effect a complete conversion of the sodium chloride, as above described. These gases act not only as the heating agent in the converter, but facilitate, by diffusion, the formation of muriatic acid, acting even more energetically than superheated steam alone. The material of which the cakes are composed is thoroughly heated to the high degree required for a complete conversion and brought in contact with the hydrogen and oxygen required for the conversion.

When it is desired to produce the corresponding potassium salts, I substitute an equivalent quantity of potassium chloride for the sodium chloride in the herein-described process.

I claim as my invention—

1. The herein-described method of treating chloride of sodium or potassium, whereby the chloride is converted into oxide and muriatic-acid gas is generated, which consists in mixing the chloride with clay and heating the mixture in a converter directly by passing highly-heated gases containing steam through the converter, substantially as set forth.

2. The herein-described method of obtaining the oxide of sodium or potassium from the chloride thereof, which consists in mixing the chloride with clay, heating the mixture in a converter directly by passing highly-heated gases containing steam through the converter, smelting the converted material together with an alkali, and then extracting the sodium or potassium combinations by lixiviation, substantially as set forth.

Witness my hand this 26th day of July, 1887.

A. KAYSER.

Witnesses:
JNO. J. BONNER,
F. C. GEYER.